United States Patent

Iwaya

[11] Patent Number: 5,538,485
[45] Date of Patent: Jul. 23, 1996

[54] LOCKUP CONTROL SYSTEM FOR AUTOMATIC TRANSMISSIONS

[75] Inventor: Yoshimi Iwaya, Isehara, Japan

[73] Assignee: Nissan Motor Co., Ltd., Yokohama, Japan

[21] Appl. No.: 353,302

[22] Filed: Dec. 5, 1994

[30] Foreign Application Priority Data

Dec. 22, 1993 [JP] Japan .................................. 5-324549

[51] Int. Cl.$^6$ ................................................ B60K 41/02
[52] U.S. Cl. ........................................ 477/169; 477/174
[58] Field of Search .......................... 477/168, 169 OR, 477/174 X, 175, 176; 74/731.1 OR, 733.1; 475/61, 64, 65

[56] References Cited

U.S. PATENT DOCUMENTS

| 5,060,769 | 10/1991 | Yoshimura et al. ................ 477/169 X |
| 5,152,386 | 10/1992 | Imamura ................................ 477/168 |
| 5,318,159 | 6/1994 | Kashiwabara ......................... 477/169 |
| 5,325,946 | 7/1994 | Kashiwabara et al. ............. 477/168 X |
| 5,332,073 | 7/1994 | Izuka ................................... 477/174 X |
| 5,417,622 | 5/1995 | Asayama et al. .................. 74/733.1 X |

*Primary Examiner*—Charles A. Marmor
*Assistant Examiner*—Peter Kwon
*Attorney, Agent, or Firm*—Foley & Lardner

[57] ABSTRACT

A lockup control system for automatic transmissions is constructed to determine a rate of change of the drive duty of a lockup solenoid so that the drive duty has a value for obtaining the converter state of a torque converter within a set time determined for every type of shift.

6 Claims, 3 Drawing Sheets

LOCKUP CONTROL SYSTEM FOR AUTOMATIC TRANSMISSIONS

BACKGROUND OF THE INVENTION

The present invention relates to a system for carrying out lockup control during shift of automatic transmissions for motor vehicles.

In order to improve fuel consumption by improvement of the transmission efficiency, the automatic transmissions of the lockup type are more and more adopted, in which when the torque increasing function or torque variation absorbing function is not needed, a torque converter can be put in the lockup state wherein input and output elements thereof are directly coupled.

Conventionally, lockup control of such torque converter is carried out, for example, in a way as described in Maintenance Manual of NISSAN RE4RO1A Type Full-Range Electronic Control Automatic Transmission. That is, it is determined in which area the cruising state of a motor vehicle is found, in a lockup area or converter area which are defined in connection with a predetermined speed or every speed, and in accordance with a result of determination, the torque converter is put in the lockup state wherein the input and output elements thereof are directly coupled or in the converter state wherein direct coupling of the input and output elements thereof is released.

An object of the present invention is to provide a lockup control system for automatic transmissions which contributes to a reduction in shift shock upon shift.

SUMMARY OF THE INVENTION

According to one aspect of the present invention, there is provided a system for carrying out lockup control of an automatic transmission provided with a torque converter and a lockup solenoid, the torque converter having a lockup state wherein input and output elements thereof are directly coupled and a converter state wherein direct coupling of said input and output elements released, the system comprising:

means for interruptedly releasing said torque converter from in said lockup state by changing a drive duty of said lockup solenoid during a set time determined for every type of shift; and means for determining a rate of change of said drive duty of said lockup solenoid so that said drive duty has a value for obtaining said converter state of said torque converter within said set time.

According to another aspect of the present invention, there is provided a method of carrying out lockup control of an automatic transmission, the automatic transmission being provided with a torque converter having a lockup state wherein input and output elements thereof are directly coupled and a converter state wherein direct coupling of the input and output elements is released, the method comprising the steps of:

interruptedly releasing the torque converter from in the lockup state by changing a drive duty of the lockup solenoid during a set time determined for every type of shift; and determining a rate of change of said drive duty of the lockup solenoid so that said drive duty has a value for obtaining the converter state of the torque converter within said set time.

According to still another aspect of the present invention, there is provided, in a motor vehicle:

an automatic transmission provided with a torque converter and a lockup solenoid, said torque converter having a lockup state wherein input and output elements thereof are directly coupled and a converter state wherein direct coupling of said input and output elements is released; and a controller connected to said automatic transmission, said controller including:

means for interruptedly releasing said torque converter from in said lockup state by changing a drive duty of said lockup solenoid during a set time determined for every type of shift; and means for determining a rate of change of said drive duty of said lockup solenoid so that said drive duty has a value for obtaining said converter state of said torque converter within said set time.

DETAILED DESCRIPTION OF THE INVENTION

Figure 1:
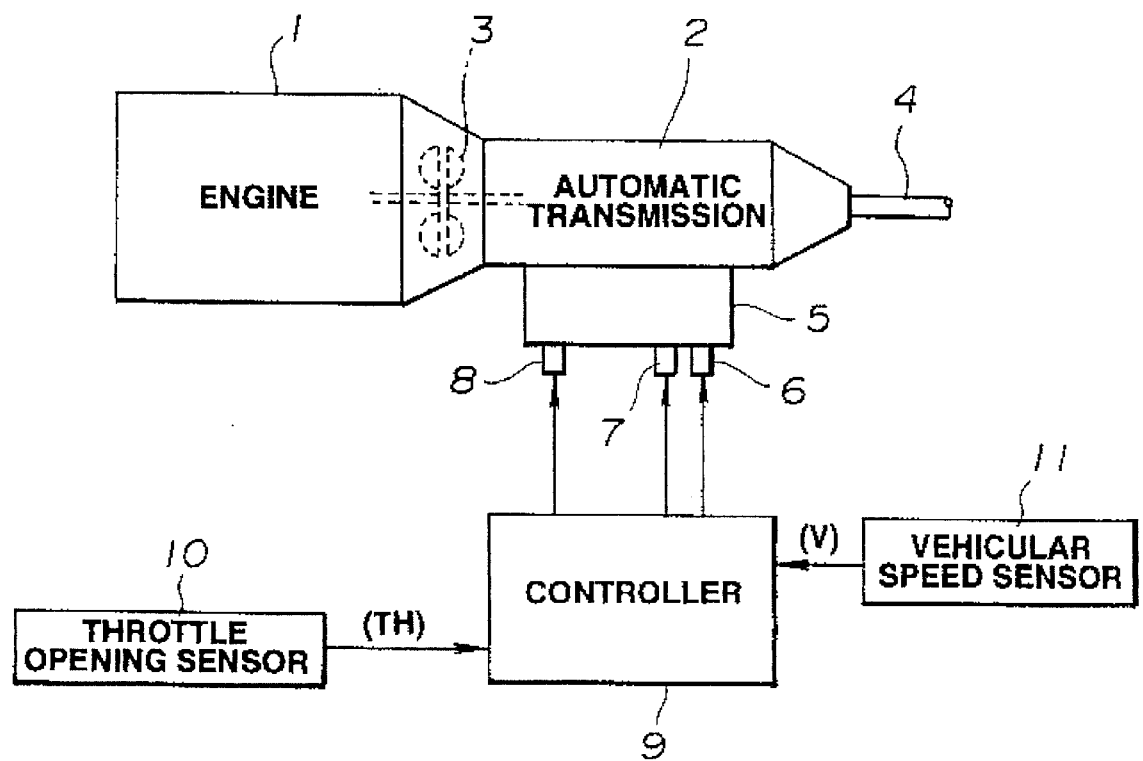
FIG. 1 is a block diagram showing a preferred embodiment of a lockup control system for automatic transmissions according to the present invention.

Referring to the drawings, a preferred embodiment of a lockup control system for automatic transmissions will be described.

Before entering a description of the preferred embodiment of the present invention, a further description will be made with regard to the conventional lockup control system.

Generally, the conventional lockup control system does not carry out lockup of the torque converter during inertia cruising of the motor vehicle, but maintains the torque converter in the converter state. However, in order to further increase the effect of improvement of fuel consumption as a primary object of lockup, it is preferable that lockup of the torque converter is also carried out during inertia cruising of the motor vehicle, and that a lockup area is enlarged up to the lowest vehicular velocity possible. Thus, with the automatic transmission as described in the above reference, the torque converter should be locked up not only at fourth speed as the highest speed, but at third speed, so that many cases can be found where shift from fourth speed to third speed is carried out in a lockup area.

If shift from fourth speed to third speed is carried out with the torque converter locked up during inertia cruising of the motor vehicle, the vehicular velocity is low when carrying out downshift from fourth speed to third speed, so that engine speed is approximately equal to idle speed, and output torque is approximately equal to zero. Under these conditions, an engine is apt to be unstable, resulting in inevitable occurrence of unsteady vibrations. Therefore, during such shift, lockup of the torque converter needs to be interrupted so that torque variation absorbing function is active to restrain unsteady vibrations.

Generally, lockup interruption control during shift is carried out through a lockup prohibition flag which is generated during a set time determined for every type of shift. That is, lockup of the torque converter is interrupted to prevent shift shock during a period of time from generation of a shift command to lapse of the set time.

With the automatic transmission as described in the above reference, shift from third speed to fourth speed may be commanded again only by slight movement of an accelerator pedal immediately after generation of a shift command from fourth speed to third speed, or slight variation in vehicular velocity. In that case, actual shift cannot follow a shift command, so that the effective speed is held at fourth speed. However, long appearance of the lockup prohibition flag operates to temporarily release lockup of the torque converter during the set time determined for every type of shift, then put the torque converter in the lockup state again. Such transition of lockup→interruption thereof → lockup produces great shock since operation of the engine is unstable during inertia cruising as described above.

Therefore, in case that the automatic transmission maintains fourth speed in effect though a shift command from fourth speed to third speed is generated immediately after generation of a shift command from third speed to fourth speed as described above, the lockup prohibition flag is normally set to have short appearance so that the torque converter is also held in the lockup state in view of unnecessary lockup prohibition thereof.

Figure 3A:
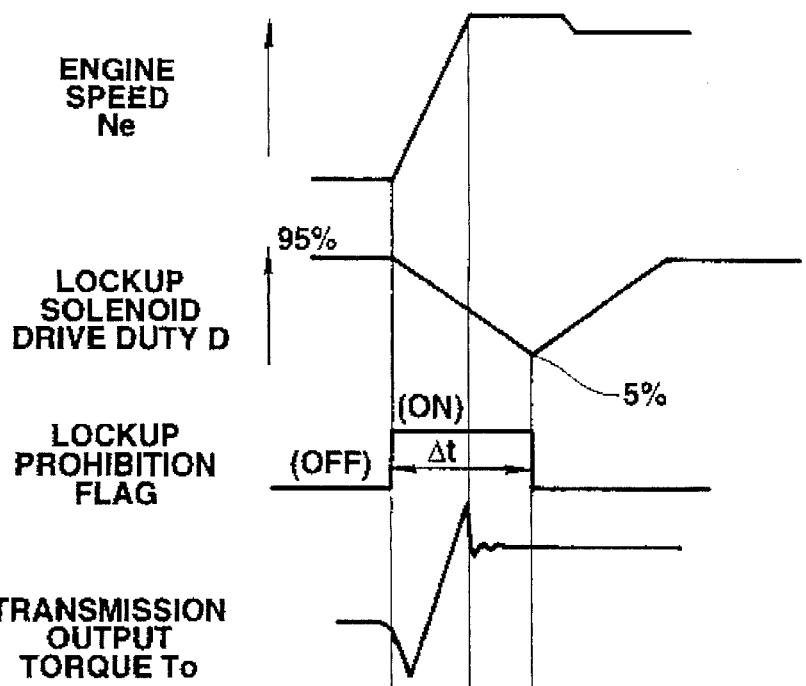
FIG. 3A is a time chart of lockup control during shift, executed by a conventional lockup control system.

On the other hand, conventionally, lockup and release of the torque converter is generally carried out little by little in view of measures against shock. However, if such changeover control is directly applied to the above shift control and lockup control, the following problem arises:

FIG. 3A shows a temporal change of engine speed Ne, drive duty D of a lockup solenoid, lockup prohibition flag, and output torque To of the automatic transmission when having the above shift control and lockup control applied. The lockup prohibition flag is generated during a period of time from a shift command time $t_1$ to a time $t_3$ which includes a shift time $t_2$ and corresponds to lapse of a set time $\Delta t$ determined to be shorter from the above point of view. The drive duty D of the lockup solenoid is gradually decreased, in response to generation of the lockup prohibition flag, from 95% at which the torque converter is locked up, then gradually increased, in response to disappearance of the lockup prohibition flag, to 95% which is a value for locking up the torque converter again.

However, a gradual decrease in the drive duty D of the lockup solenoid causes a phenomenon that the drive duty D of the lockup solenoid is not yet 5% which is a value for interrupting lockup of the torque converter even at the time $t_3$ at which the lockup prohibition flag disappears, and it is increased from the time $t_3$ so as to attain the value for locking up the torque converter again.

This results in the fact that when carrying out shift from fourth speed to third speed in a lockup area, lockup of the torque converter is not released at the shift time $t_2$, resulting in occurrence of great shift shock as seen from the peak in a waveform of the output torque To of the automatic transmission.

FIG. 1 shows a lockup control system for automatic transmissions embodying the present invention, wherein reference numeral 1 designates an engine 1, and 2 designates an automatic transmission. The automatic transmission 2 inputs power of the engine 1 through a torque converter 3, and changes input rotation at the gear ratio corresponding to a selected speed, which is transmitted to an output shaft 4.

The automatic transmission 2 has a selected speed determined by a combination of turning-on and turning-off of shift solenoids 6, 7 in a control valve 5. By the drive duty D (%) of a lockup solenoid 8 in the control valve 5, the torque converter 3 is put in the lockup state when $D \geq 95\%$, and in the converter state when $D \leq 5\%$.

A controller 9 is arranged to control turning-on and turning-off of the shift solenoids 6, 7 and the drive duty D of the lockup solenoid 8. The controller 9 inputs a signal derived from a throttle opening sensor 10 for sensing a throttle opening TH of the engine 1, and a signal derived from a vehicular velocity sensor 11 for sensing a vehicular velocity V through the rotating speed of the output shaft 4 of the automatic transmission 2.

In accordance with the above input information, the controller 9 carries out a well-known computation (not shown) for shift control. That is, a predetermined shift is carried out through operation of, first, determination of an optimal speed for the actual cruising state by, for example, the table look-up method in accordance with the throttle opening TH and the vehicular velocity V, then, turning-on and turning-off of the shift solenoids 6, 7 to select the optimal speed.

In addition to shift control, the controller 9 carries out ordinary lockup control as will be described later, and lockup control during shift which is an object of the present invention. As to ordinary lockup control, for example, it is determined in which area the cruising state of a motor vehicle is found, in a lockup area or converter area which are defined by the throttle opening TH and the vehicular velocity V in connection with a predetermined speed or every speed, and in accordance with a result of determination, the drive duty D of the lockup solenoid 8 is set to 95% to put the torque converter 3 in the lockup state, or 5% to put the torque converter 3 in the converter state.

Figure 2:
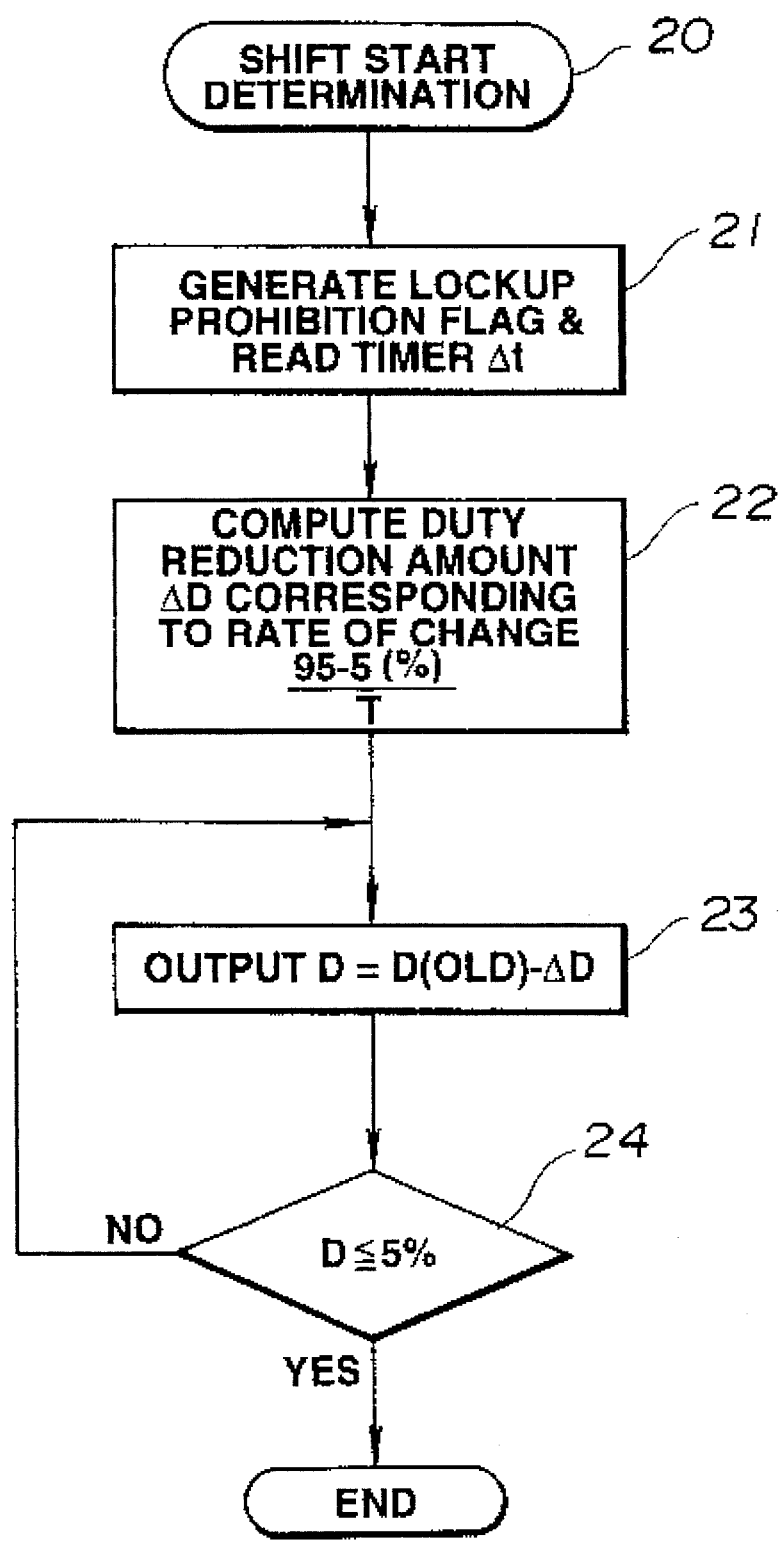
FIG. 2 is a flowchart showing operation of the preferred embodiment of the present invention.

The controller 9 carries out lockup control during shift in accordance with a control program as shown in FIG. 2. The control program is executed when a start of shift is determined, i.e., a shift command is generated (step 20). A timer $\Delta t$ of the lockup prohibition flag for every type of shift is read (step 21), the lockup prohibition flag being continuously generated during this set time. Then, in order to reduce during a time T shorter than the set time $\Delta t$ the drive duty D of the lockup solenoid 8 from 95% which is a value for putting the torque converter 3 in the lockup state to 5% which is a value for putting the torque converter 3 in the converter state, a duty reduction amount $_\Delta D$ per operation is computed which corresponds to the rate of change $(95\%-5\%)/T$ of the drive duty D of the lockup solenoid 8 (step 22).

Subsequently, a new drive duty $_\Delta D$ of the lockup solenoid 8 is obtained by subtracting the duty reduction amount $_\Delta D$ from the previous drive duty D (OLD) of the lockup solenoid 8, which is output thereto (step 23). Such duty reduction is continued until the drive duty D is less than 5% (step 24) so as to turn the state of the torque converter 3 from the lockup state to the converter state.

Figure 3B:
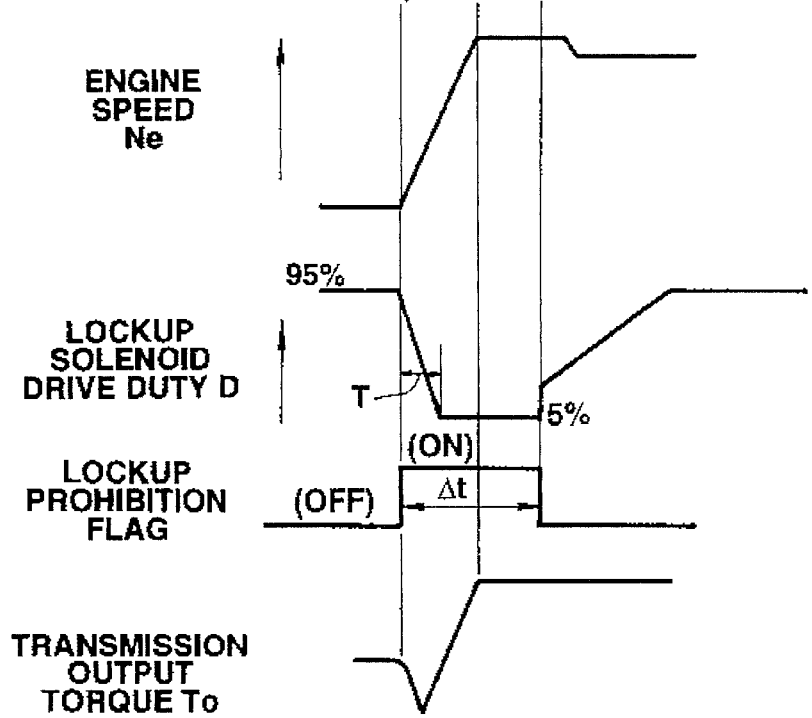
FIG. 3B is a view similar to FIG. 3A, executed by the lockup control system of the present invention.

In such a way, according to the present invention, as shown in FIG. 3B, the drive duty D of the lockup solenoid 8 is reduced to 5% which is a value for interrupting lockup of the torque converter 3 during the time T shorter than the set time $_\Delta t$ of the lockup prohibition flag. Thus, though the set time $_\Delta t$ of the lockup prohibition flag should be shortened for the above reason, and the drive duty D of the lockup solenoid 8 is gradually reduced in an ordinary way, the situation that the torque converter 3 is held still locked up at the shift time $t_2$ fails to occur definitely, resulting in sure prevention of occurrence of great shift shock.

Having described the present invention in connection with the preferred embodiment, it is to be noted that the present invention is not limited thereto, and various changes and modifications are possible without departing from the spirit of the present invention.

What is claimed is:

1. A system for carrying out lockup control of an automatic transmission provided with a torque converter and a lockup solenoid, the torque converter having a lockup state wherein input and output elements thereof are directly coupled and a converter state wherein direct coupling of said input and output elements is released, the system comprising:

means for interruptedly releasing said torque converter from said lockup state by changing a drive duty of said lockup solenoid during a set time determined for every type of shift; and means for determining a rate of change of said drive duty of said lockup solenoid so that said drive duty has a value wherein said converter State of said torque converter is achieved within said set time.

2. A system as claimed in claim 1, wherein said determining means comprises:

means for computing a duty reduction amount corresponding to a rate of change of said drive duty of said lockup solenoid; and means for outputting to said lockup solenoid a new drive duty of said lockup solenoid obtained by subtracting said duty reduction amount from said drive duty of said lockup solenoid.

3. A method of carrying out lockup control of an automatic transmission, the automatic transmission being provided with a torque converter having a lockup state wherein input and output elements thereof are directly coupled and a converter state wherein direct coupling of the input and output elements is released, the method comprising the steps of:

interruptedly releasing the torque converter from the lockup state by changing a drive duty of the lockup solenoid during a set time determined for every type of shift; and determining a rate of change of said drive duty of the lockup solenoid so that said drive duty has a value wherein the converter state of the torque converter is achieved within said set time.

4. A method as claimed in claim 3, wherein said determining step comprises:

computing a duty reduction amount corresponding to a rate of change of said drive duty of the lockup solenoid; and outputting to the lockup solenoid a new drive duty of the lockup solenoid obtained by subtracting said duty reduction amount from said drive duty of the lockup solenoid.

5. In a motor vehicle:

an automatic transmission provided with a torque converter and a lockup solenoid, said torque converter having a lockup state wherein input and output elements thereof are directly coupled and a converter state wherein direct coupling of said input and output elements is released; and a controller connected to said automatic transmission, said controller including:

means for interruptedly releasing said torque converter from said lockup state by changing a drive duty of said lockup solenoid during a set time determined for every type of shift; and means for determining a rate of change of said drive duty of said lockup solenoid so that said drive duty has a value wherein said converter state of said torque converter is achieved within said set time.

6. A motor vehicle as claimed in claim 5, wherein said determining means comprises:

means for computing a duty reduction amount corresponding to a rate of change of said drive duty of the lockup solenoid; and means for outputting to the lockup solenoid a new drive duty of the lockup solenoid obtained by subtracting said duty reduction amount from said drive duty of the lockup solenoid.

* * * * *